United States Patent
In-Albon et al.

(10) Patent No.: US 8,857,316 B2
(45) Date of Patent: Oct. 14, 2014

(54) APPARATUS FOR PRODUCING COFFEE OR OTHER BEVERAGES

(76) Inventors: Jean-Paul In-Albon, Ardon (CH); Hans-Robert Bircher, Münsingen (CH)

(*) Notice: Subject to any disclaimer, the term of this patent is extended or adjusted under 35 U.S.C. 154(b) by 246 days.

(21) Appl. No.: 13/263,859

(22) PCT Filed: Feb. 9, 2010

(86) PCT No.: PCT/EP2010/000772
§ 371 (c)(1),
(2), (4) Date: Oct. 28, 2011

(87) PCT Pub. No.: WO2010/121680
PCT Pub. Date: Oct. 28, 2010

(65) Prior Publication Data
US 2012/0037007 A1    Feb. 16, 2012

(51) Int. Cl.
*A47J 31/40*    (2006.01)
*A47J 31/36*    (2006.01)

(52) U.S. Cl.
CPC .......... *A47J 31/3614* (2013.01); *A47J 31/3619* (2013.01)
USPC ............................ 99/286; 99/289 D; 99/302 P

(58) Field of Classification Search
USPC .......... 99/286, 302 P, 289 R, 287, 297, 302 R
See application file for complete search history.

(56) References Cited

U.S. PATENT DOCUMENTS

| | | | |
|---|---|---|---|
| 1,390,008 A * | 9/1921 | Arduino | 99/286 |
| 3,085,496 A * | 4/1963 | Reynolds | 99/289 R |
| 3,137,227 A * | 6/1964 | Valente | 99/283 |
| 3,760,712 A * | 9/1973 | Rossi | 99/289 R |
| 4,110,221 A * | 8/1978 | Moser | 210/481 |
| 4,457,216 A * | 7/1984 | Dremmel | 99/287 |
| 4,491,063 A * | 1/1985 | Grossi | 99/289 R |
| 4,681,028 A * | 7/1987 | Schmed et al. | 99/289 R |
| 4,852,472 A * | 8/1989 | In-Albon et al. | 99/289 R |
| 4,941,399 A * | 7/1990 | Zucchetti | 99/289 P |
| 5,197,372 A * | 3/1993 | Schneeberger | 99/287 |
| 5,230,277 A * | 7/1993 | Bianco | 99/287 |
| 5,275,089 A * | 1/1994 | Armellin | 99/289 R |
| 5,302,407 A * | 4/1994 | Vetterli | 426/433 |
| 5,431,088 A * | 7/1995 | Cia et al. | 99/287 |
| 5,463,934 A * | 11/1995 | Locati | 99/286 |
| 5,551,988 A * | 9/1996 | Reyhanloo et al. | 134/22.1 |
| 5,865,096 A * | 2/1999 | Kawabata | 99/302 P |
| 6,101,923 A * | 8/2000 | Karg et al. | 99/289 D |

(Continued)

FOREIGN PATENT DOCUMENTS

EP    2036467 A1    3/2009

*Primary Examiner* — Henry Yuen
*Assistant Examiner* — Jimmy Chou
(74) *Attorney, Agent, or Firm* — Brian Roffe

(57) ABSTRACT

An apparatus for producing coffee or other beverages has two brewing cylinders and brewing pistons which are movable in the brewing cylinders and which form a brewing chamber. A loading station is provided for loading the brewing chambers with ground coffee or the other media. One brewing cylinder can be moved in each case together with the associated brewing piston from a brewing position to the loading station and back again, wherein the associated brewing piston can be removed for the disposal of the used coffee or medium from the brewing cylinder. The second brewing cylinder can therefore be moved to the same loading station as the first, and this therefore results in a simplification of the design of the apparatus.

17 Claims, 3 Drawing Sheets

(56) References Cited

U.S. PATENT DOCUMENTS

| | | | |
|---|---|---|---|
| 6,240,832 B1 * | 6/2001 | Schmed et al. | 99/289 R |
| 6,253,664 B1 * | 7/2001 | Giannelli | 99/302 P |
| 6,745,668 B2 * | 6/2004 | Levi et al. | 99/289 P |
| 7,017,474 B2 * | 3/2006 | Comte | 99/302 P |
| 7,322,275 B2 * | 1/2008 | Lussi | 99/281 |
| 8,240,245 B2 * | 8/2012 | Doglioni Majer | 99/302 P |
| 2010/0209577 A1 * | 8/2010 | Doglioni Majer | 426/433 |

* cited by examiner

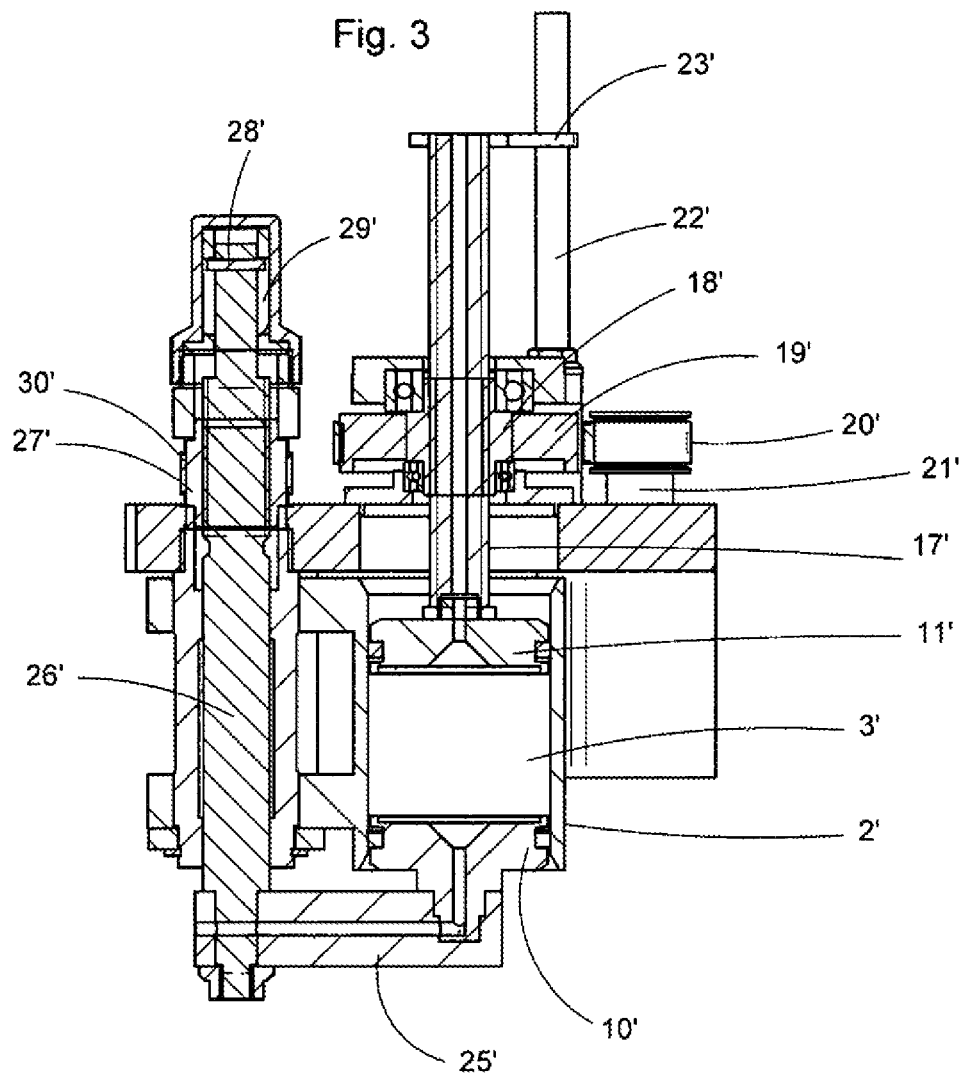

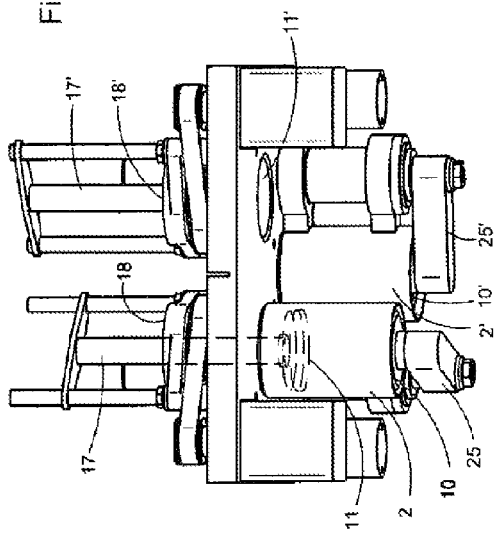
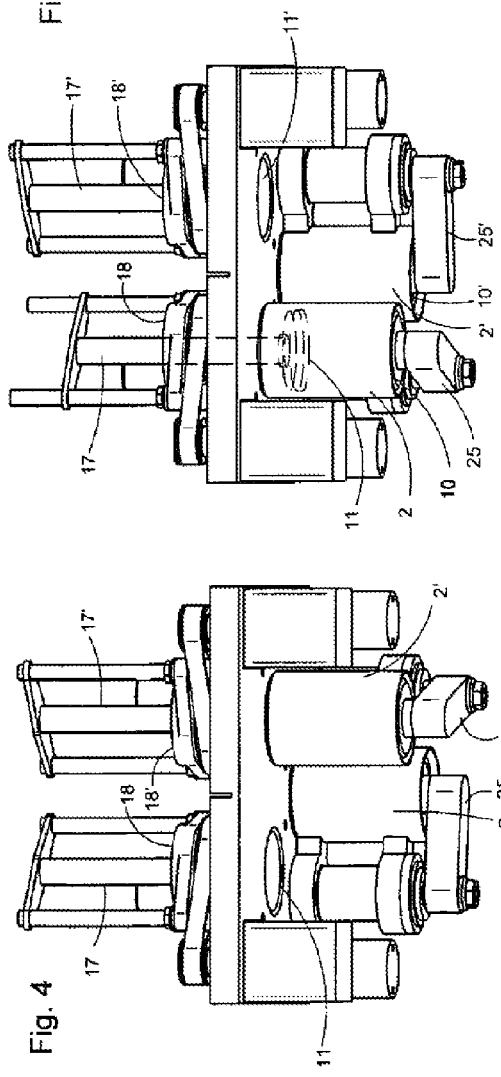
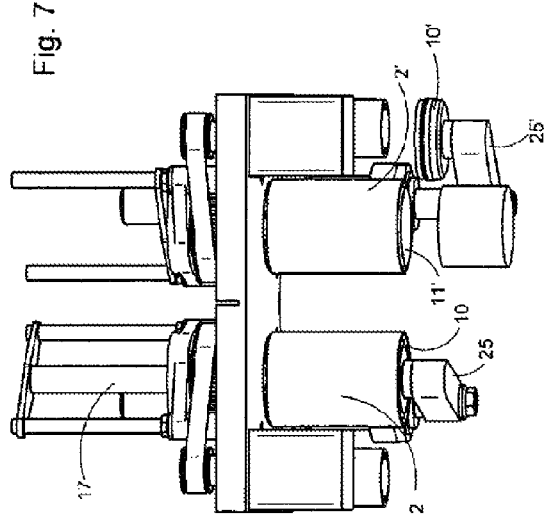
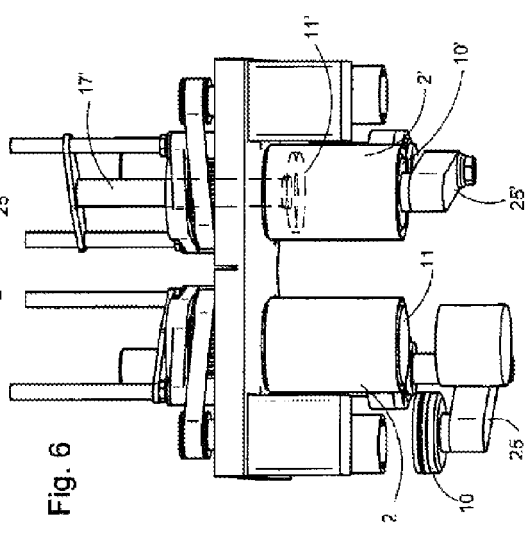

APPARATUS FOR PRODUCING COFFEE OR OTHER BEVERAGES

FIELD OF THE INVENTION

The invention relates to an apparatus for producing coffee or other beverages including at least one brewing cylinder, brewing pistons movable within the brewing cylinder(s) and which form a brewing chamber therewith, and a loading station for loading the brewing chamber with ground coffee or other media provided for the preparation of the respective beverage.

BACKGROUND OF THE INVENTION

Apparatuses of this type, for example coffee machines, are known wherein the brewing cylinder is positioned stationarily, and both during the loading of the brewing chamber with ground coffee and during the brewing process is therefore to be found in the same position. The grinding mechanism for the coffee is located directly next to the brewing cylinder so that, due to the heat in the brewing cylinder, the coffee not directly intended for brewing is disadvantageously also heated.

OBJECTS AND SUMMARY OF THE INVENTION

The object forming the basis of the present invention is to provide an apparatus of the type specified at the start wherein not only the aforementioned disadvantage is eliminated, but also more efficient production of coffee or other beverages is possible.

This object is achieved according to the invention by an apparatus in which the brewing cylinder can be moved together with one brewing piston out of a brewing position to a loading station and back, this brewing piston being removable in order to expel the used coffee or medium from the brewing cylinder.

Further preferred embodiments of the apparatus according to the invention form the subject matter of the dependent claims.

Since according to the invention the brewing cylinder can be moved from a loading position into a brewing position and back, the grinding mechanism or a number of grinding mechanisms can be thermally isolated sufficiently from the brewing cylinder. It is particularly advantageous that already during the brewing process in one brewing cylinder the brewing chamber of a further brewing cylinder can be loaded. Preferably, even more than two brewing cylinders can be provided which can be moved independently of one another between the two positions so that parallel brewing processes in these brewing cylinders can overlap temporally. In a particularly preferred manner a number of grinding mechanisms are assigned to the station for loading, it being possible to convey the material to be ground of each grinding mechanism optionally into each of the available brewing chambers.

Means, such as for example valves, can preferably be provided with which the brewed coffee can be conveyed from individual brewing chambers to one or more outlets as desired. Coffee can also be conveyed from all of the brewing chambers into the same coffee outlet if, for example, larger quantities are required.

BRIEF DESCRIPTION OF THE DRAWINGS

In the following the invention is described in more detail by means of the drawings. These show as follows:

FIG. 3 is a section along line III-III in FIG. 1, with a second brewing cylinder in a brewing position; and FIGS. 4-7 show the apparatus according to FIGS. 1 to 3 in a perspective illustration in four working cycle phases.

DETAILED DESCRIPTION OF THE INVENTION

Figure 1:
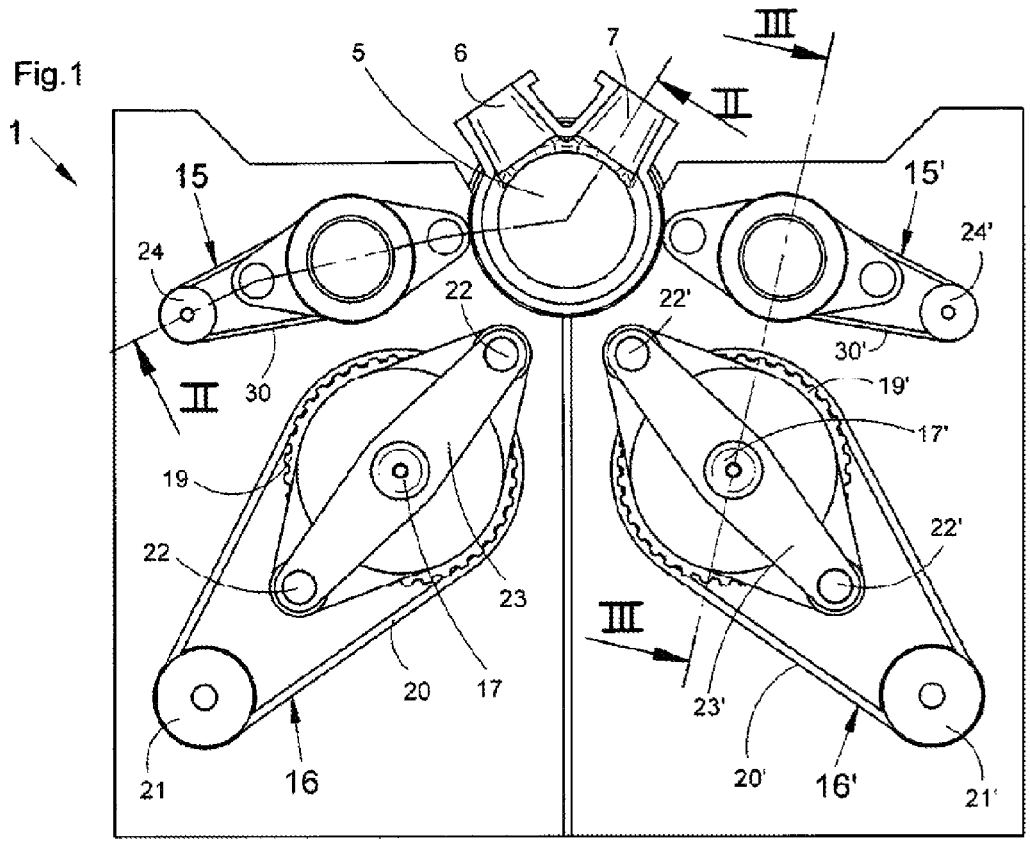
FIG. 1 is diagrammatically, in a top view, an exemplary embodiment of an apparatus according to the invention for producing coffee comprising two brewing cylinders and a station for loading the brewing chamber of the respective brewing cylinder.

In FIGS. 1 to 7 an apparatus 1 for producing coffee is shown which comprises two brewing units each having a brewing cylinder 2, 2' enclosing a respective brewing chamber 3, 3' as obvious from FIGS. 2 and 3 and FIGS. 4 to 7, and a station 5 for loading the respective brewing chamber 3, 3' with ground coffee. According to FIG. 1 the material to be ground can be conveyed from a respective grinding mechanism (not shown in the drawing) to the station 5 via powder passages 6, 7. The grinding mechanisms are preferably driven by a common motor, optionally only one grinding mechanism respectively being used.

The brewing chamber 3, 3' of the respective brewing cylinder 2, 2' can be closed on the face side by a respective brewing piston 10, 10'; 11, 11' moveable in the axial direction of the brewing cylinder 2, 2', and which can be moved independently of one another. In the exemplary embodiment shown the brewing cylinders 2, 2' are arranged vertically. For the movement of the lower brewing pistons 10, 10' a respective drive 15, 15' is provided, and the movement of the upper brewing pistons 11, 11' is brought about by a respective drive 16, 16' (FIG. 1).

The upper brewing pistons 11, 11', which in the exemplary embodiment shown only perform a vertical stroke movement, are respectively connected to a piston rod 17, 17' in the form of a threaded rod, and respectively interact with a threaded nut 18, 18' which is driven, for example, via a toothed belt disc 19, 19' and a toothed belt 20, 20' by a drive motor 21, 21'. The piston rods 17, 17' and the upper brewing pistons 11, 11' are secured against rotating here by means of a yoke plate 23, 23' respectively guided over two fixed guide rods 22, 22'.

Figure 2:
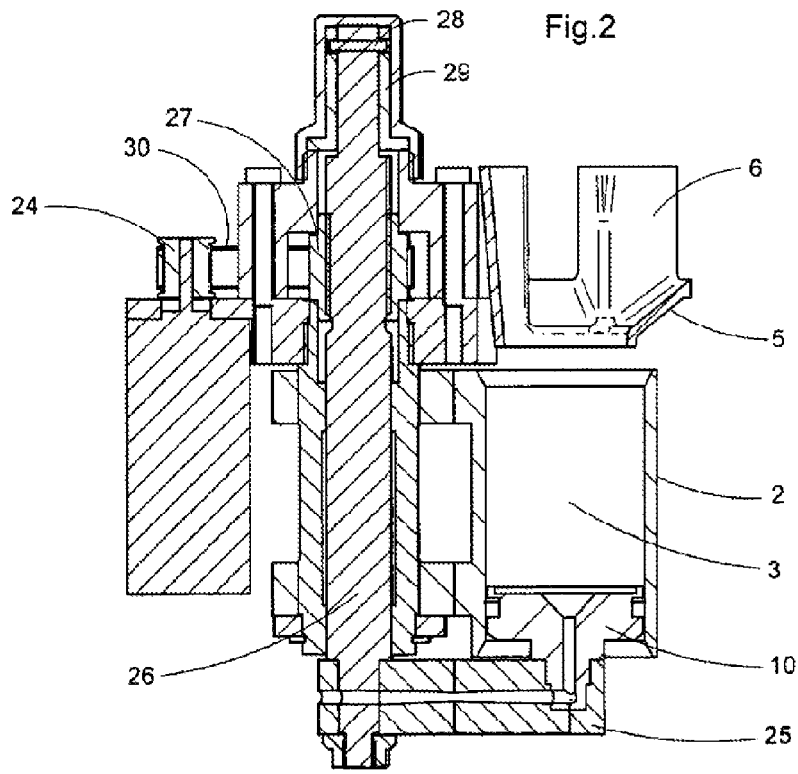
FIG. 2 is a section along line II-II in FIG. 1, with a first brewing cylinder in a loading position.

The lower brewing pistons 10, 10' execute a combined stroke and pivot movement. They are respectively disposed on a pivot arm 25, 25' which is connected to a guide axis 26, 26' (FIGS. 2 and 3). The guide axes 26, 26' are respectively functionally connected to a threaded nut 27, 27' that can be driven by a drive motor 24, 24' via a drive belt 30, 30' and can be moved by the latter axially, by means of which the stroke movement of the lower brewing pistons 10, 10' (together with the pivot arms 25, 25') is brought about. Here the respective lower brewing piston 10, 10' can be pushed downwards out of the respective brewing cylinder 2, 2'. By means of a cross pin 28, 28' inserted in the respective guide axis 26, 26' and which interacts with a connecting link 29, 29', with the axial movement of the guide axis 26, 26' a pivot movement of the pivot arm 25, 25' carrying the lower brewing piston 10, 10' is forced.

By means of the pivot arm 25, 25' on the one hand the lower brewing piston 10, 10' pushed out of the respective brewing cylinder 2, 2' can be pivoted out of the position coaxial to the brewing cylinder 2, 2' in order to clear the brewing chamber 3, 3' so as to expel the used coffee powder (this is then implemented by means of the upper brewing piston 11, 11'), but on the other hand the whole brewing cylinder 2, 2' can be pivoted with the lower brewing piston 10, 10' out of a loading position shown in FIG. 2 into a brewing position according to FIG. 3 and vice versa. Of course this can only happen when the upper brewing piston 11, 11' is located outside of the brewing cylinder 2, 2', i.e. is pushed out upwards. It would by all means be possible to separate the pivot movement from the upwards and downwards movement of the guide axis, and to implement it by means of a separate drive or by some other means away from the brewing cylinder to the side.

In the following the sequence of a working cycle implementable with the apparatus 1 is described by means of FIGS. 4 to 7.

FIG. 4 shows a phase in which the first brewing cylinder 2 is located in the loading position corresponding to FIG. 2 beneath the station 5. The upper brewing piston 11 is located in its uppermost position. The brewing cylinder 2 open to the top is loaded with material to be ground. The other brewing cylinder 2' is located in the brewing position, but is still empty. The second upper brewing piston 11' is positioned above the second brewing cylinder 2'.

FIG. 5 shows a phase in which the first brewing cylinder 2 together with the lower brewing piston 10 has been pivoted back into the brewing position by means of the pivot arm 25 functionally connected to the drive 15. The upper brewing piston 11 has been introduced into the brewing cylinder 2 by means of the drive 16, and is moved downwards, i.e. the brewing process is implemented. Meanwhile the second brewing cylinder 2' together with the lower brewing piston 10' has been pivoted by the pivot arm 25' functionally connected to the drive 15' out of the brewing position (unhindered by the upper brewing piston 11') into the loading position, and is filled with material to be ground.

In a further phase according to FIG. 6 the lower brewing piston 10 has been pushed out of the first brewing cylinder 2 by the drive 15 comprising the guide rod 26 and pivoted out of the position coaxial to the brewing cylinder 2 with the pivot arm 25. The used coffee powder has been expelled downwards from the brewing chamber 3 thus cleared by means of the upper brewing piston 11. Meanwhile coffee is brewed in the second brewing cylinder 2' pivoted back into the brewing position.

FIG. 7 shows the lower brewing piston 10 of the first brewing cylinder 2 pivoted back into the position coaxial to the brewing cylinder 2 and introduced from below into the brewing cylinder 2. The upper brewing piston 11 has been moved upwards again out of the brewing cylinder 2. This first brewing cylinder 2 is now ready again to pivot into the loading position, while at the end of the brewing process the used coffee powder is expelled from the second brewing cylinder 2'.

The apparatus 1 according to the invention makes it possible to load the respective brewing cylinder 2, 2' with material to be ground from one side and to discard the coffee grounds on the other side. The expulsion downwards is associated with the advantage that no additional apparatus is required to remove the used coffee powder.

The flow of the hot water introduced into the brewing chambers 3, 3' on the one hand and of the fully brewed coffee conveyed out of the brewing chambers 3, 3' to one or two outlets on the other hand can take place both from the top to the bottom and from the bottom to the top.

The principle according to the invention of the spatial separation of the brewing and the loading of the brewing chamber is advantageous with regard to the thermal separation of the grinding mechanism from the brewing unit. When using two brewing units the brewing chamber of the other brewing cylinder can advantageously already be loaded during the brewing process in a brewing cylinder. Preferably even more than two brewing cylinders can be provided which can be moved independently of one another between the two positions so that parallel brewing processes in these brewing cylinders can overlap temporally. In a particularly preferred manner a number of grinding mechanisms are assigned to the station for loading, the material to be ground of each grinding mechanism being optionally conveyable into each of the brewing chambers available.

Means, such as for example valves, can preferably be provided with which the brewed coffee from individual brewing chambers can be conveyed to one or more outlets as desired. Coffee from all of the brewing chambers can also be conveyed into the same coffee outlet if, for example, larger quantities are required.

Instead of with material to be ground, in the loading position the respective brewing chamber can also be loaded with other materials suitable for the preparation of a beverage and with cleaning agents in any conceivable form, such as e.g. in the form of solids, powders, flakes, granules, tablets, liquid etc. These materials can also be, for example, powdered or liquid milk, tea in powder or also in leaf form, cocoa and chocolate (both powder, flakes and pieces), syrups and other aromatic substances or alcoholic drinks.

The movement of the brewing cylinder or the brewing cylinders out of a loading position into a brewing position and back could also be implemented differently from how is described above, e.g. by translation or rotation (axis of rotation parallel, at an angle or perpendicular to the brewing cylinder axis).

The invention claimed is:

1. An apparatus for producing a beverage, comprising:
a movable brewing cylinder having an open top and an open bottom;
an upper brewing piston movable into and out of said open top of said brewing cylinder,
a lower brewing piston movable into and out of said open bottom of said brewing cylinder,
said brewing cylinder and said upper and lower brewing pistons when at least partly present in said brewing cylinder forming a brewing chamber,
said apparatus defining a loading station in which said brewing cylinder is loadable through said open top of said brewing cylinder, while said upper brewing piston of said brewing cylinder is out of said brewing cylinder, with material for preparation of the beverage,
said apparatus defined a brewing position in which the material loaded into said brewing cylinder is brewed,
said brewing cylinder being movable, while said lower brewing piston is situated at least partly in said brewing cylinder, between said loading station and said brewing position,
said lower brewing piston of said brewing cylinder being removable from said brewing cylinder to enable expulsion of the material from said brewing cylinder through said open bottom of said brewing cylinder; and
a pivot arm connected to said lower brewing piston and that enables movement of said lower brewing piston into and out of said brewing cylinder;
said lower brewing piston including a conduit communicating with said brewing chamber; and
said pivot arm including a conduit communicating with said conduit in said lower brewing piston to enable brewed material from said brewing chamber to be conveyed out of said brewing chamber through said pivot arm.

2. The apparatus of claim 1, further comprising an additional movable brewing cylinder having an open top and an open bottom, an additional upper brewing piston movable into and out of said open top of said additional brewing cylinder and an additional lower brewing piston movable into and out of said open bottom of said additional brewing cylinder, and said additional brewing cylinder and said additional upper and lower brewing pistons when at least partly present in said additional brewing cylinder forming an additional brewing chamber, said additional brewing cylinder being movable between said loading station and said brewing position by a different movement means than movement means that cause movement of said brewing cylinder between said loading station and said brewing position.

3. The apparatus of claim 1, wherein said upper and lower brewing pistons are movable in an axial direction of said brewing cylinder.

4. The apparatus of claim 2, further comprising an additional pivot arm connected to said additional lower brewing piston and that causes movement of said additional lower brewing piston into and out of said additional brewing cylinder.

5. The apparatus of claim 1, further comprising movement means, additional to said pivot arm, for moving said lower brewing piston into and out of said brewing cylinder.

6. The apparatus of claim 1, wherein said upper brewing piston is movable by a different movement means than movement means that move said lower brewing piston such that said upper and lower brewing pistons are independently movable relative to one another.

7. The apparatus of claim 1, wherein said pivot arm causes movement of said brewing cylinder between said loading station and said brewing position when said lower brewing piston is at least partly in said brewing cylinder.

8. The apparatus of claim 1, wherein said brewing cylinder is vertically oriented.

9. The apparatus of claim 1, wherein said pivot arm moves said lower piston out of said brewing cylinder and away from a position below said open bottom of said brewing cylinder such that said upper brewing piston is then movable downward through said brewing chamber to expel the material out of said brewing chamber.

10. The apparatus of claim 9, further comprising a common drive that provides for movement of said lower brewing piston into and out of said brewing cylinder and pivotal movement of said lower brewing piston away from the position below said open bottom of said brewing cylinder.

11. The apparatus of claim 1, further comprising passages for connecting at least one grinding mechanism for the material to said loading station.

12. The apparatus of claim 1, further comprising an additional movable brewing cylinder having an open top and an open bottom, an additional upper brewing piston movable into and out of said open top of said additional brewing cylinder and an additional lower brewing piston movable into and out of said open bottom of said additional brewing cylinder, and said additional brewing cylinder and said additional upper and lower brewing pistons when at least partly present in said additional brewing cylinder forming an additional brewing chamber, only one of said brewing cylinder or said additional brewing cylinder being situated in said loading station and being loadable with material at a time.

13. The apparatus of claim 1, wherein said upper brewing piston includes a conduit communicating with said brewing chamber of said brewing cylinder.

14. The apparatus of claim 1, wherein said lower brewing piston is maintained in said brewing cylinder when said brewing cylinder is in said loading station and in said brewing station.

15. The apparatus of claim 1, wherein said upper brewing piston is maintained in said brewing cylinder when said brewing cylinder is in said brewing station.

16. The apparatus of claim 1, wherein said upper and lower brewing pistons are movable in an axial direction of said brewing cylinder and said brewing cylinder is configured to be movable in a direction perpendicular to the axial direction of said brewing cylinder.

17. The apparatus of claim 1, wherein said upper and lower brewing pistons are movable in an axial direction of said brewing cylinder and said brewing cylinder is configured to be pivotable about an axis parallel to an axis of said brewing cylinder.

* * * * *